United States Patent
Harada et al.

(10) Patent No.: US 6,636,747 B2
(45) Date of Patent: Oct. 21, 2003

(54) MULTI-MODE RADIO TRANSMISSION SYSTEM

(75) Inventors: Hiroshi Harada, Yokosuka (JP); Masayuki Fujise, Yokosuka (JP)

(73) Assignee: Communications Research Laboratory, Independent Administrative Institution, Koganei (JP)

( * ) Notice: Subject to any disclaimer, the term of this patent is extended or adjusted under 35 U.S.C. 154(b) by 0 days.

(21) Appl. No.: 09/263,214

(22) Filed: Mar. 5, 1999

(65) Prior Publication Data

US 2002/0111187 A1 Aug. 15, 2002

(30) Foreign Application Priority Data

Mar. 6, 1998 (JP) .......................................... 10-073206

(51) Int. Cl.[7] .............................. H04B 1/38; H04M 3/00
(52) U.S. Cl. ...................... 455/552; 455/419; 455/553
(58) Field of Search ................................. 455/552, 553, 455/418, 419, 420, 422, 433, 556, 557, 560, 561; 359/145, 136, 173, 143, 179

(56) References Cited

U.S. PATENT DOCUMENTS

| | | | | |
|---|---|---|---|---|
| 4,788,657 A | * | 11/1988 | Douglas et al. | 364/900 |
| 5,020,093 A | * | 5/1991 | Pireh | 455/552 |
| 5,163,050 A | * | 11/1992 | Cromack | 370/110.03 |
| 5,321,514 A | * | 6/1994 | Martinez | 348/723 |
| 5,335,355 A | * | 8/1994 | Tanaka et al. | 455/553 |
| 5,574,973 A | * | 11/1996 | Borth et al. | 455/432 |
| 5,689,355 A | * | 11/1997 | Okubo et al. | 359/179 |
| 5,719,761 A | * | 2/1998 | Gatti et al. | 364/130 |
| 5,754,542 A | * | 5/1998 | Ault et al. | 370/342 |
| 5,794,141 A | * | 8/1998 | Zicker | 455/418 |
| 5,854,978 A | * | 12/1998 | Heidari | 455/418 |
| 5,884,189 A | * | 3/1999 | Yamazaki et al. | 455/552 |
| 5,905,718 A | * | 5/1999 | Kurokami et al. | 370/328 |
| 5,936,754 A | * | 8/1999 | Ariyavisitakul et al. | 359/145 |
| 5,995,829 A | * | 11/1999 | Broderick | 455/418 |
| 6,009,445 A | * | 12/1999 | Tsyrganovich | 708/300 |
| 6,188,898 B1 | * | 2/2001 | Phillips | 455/433 |
| 6,222,828 B1 | * | 4/2001 | Ohlson et al. | 370/320 |

FOREIGN PATENT DOCUMENTS

| | | |
|---|---|---|
| EP | 0 802 694 A2 | 10/1997 |
| GB | 2 292 047 | 2/1996 |
| JP | 08-186875 | 7/1996 |
| JP | 08-265820 | 10/1996 |
| JP | 09-009348 | 1/1997 |
| JP | 09-163450 | 6/1997 |
| JP | 9-200840 | 7/1997 |
| JP | 9-502592 | 11/1997 |
| WO | WO 96/14719 | 5/1996 |

OTHER PUBLICATIONS

R. Lackey, et al., IEEE Communications Magazine, Vol. 33, No. 5, pp. 56–61, "Speakeasy: The Military Software Radio," May 1, 1995.

* cited by examiner

*Primary Examiner*—Duc Nguyen
(74) *Attorney, Agent, or Firm*—Oblon, Spivak, McClelland, Maier & Neustadt, P.C.

(57) ABSTRACT

In order to utilize several radio communication systems with a radio terminal 1, by preparing the common modulator and demodulator part 2a and reconfigurable modulator and demodulator part 2b in advance and performing function selection means 4 with specified means of differential information 5 which information consists of the list of differential specification information of each radio communication system such as the tap coefficients of filter, frame format and the like, and their hardware address to allocate the information into digital signal processing hardware, the required radio communication systems are realized as users like.

11 Claims, 7 Drawing Sheets

MULTI-MODE RADIO TRANSMISSION SYSTEM

BACKGROUND OF THE INVENTION

1. Field of the Invention

The present invention relates to a multi-mode radio transmission system under environment available by means of a different radio communication mode.

2. Description of the Prior Art

In the present radio communication systems such as land mobile communication systems broadcasting systems, and satellite communication systems, a common transmission mode has not been determined, and a communication system is utilized on the basis of various standards.

For example, nowadays, in Japan, as digital mobile communication systems, PDC(Personal Digital Cellular) system and PHS(Personal Handy Phone) system are available. Moreover, even in Europe, GSM(Global System for Mobile Communications) system and the like has been operated.

These systems looks different each other, however these systems are based of Quadrature modulation.

As shown in FIG. 7, the Quadrature modulation is a method which can improve the transmission capacity more than two times with the use of two orthogonal axes alternatively at the same frequency. In the concrete, we use a characteristics of orthogonality between sine and cosine wave, in which the integration value during one cycle becomes to be zero when we multiply sine wave by cosine wave and integrate the multiplied value.

In the configuration for a transmitter as shown in FIG. 7, input transmission data signal is divided into two chapels of Ich(In phase channel) and Qch (Quadrature Phase Channel). Then the data of Ich is multiplied by a signal generated from one sign wave source, and the data of Qch is multiplied by a signal which is phase-shifted in 90 degrees for aforesaid sine signal. Finally, these two signals of Ich and Qch are synthesized together.

On the other hand, in a receiver, a signal is recovered by means of performing a reversible operation for the transmitter.

As described above, in an environment, in which a plurality of radio communication systems exist, a user must possess a radio terminal for a radio communication service. In other wards, in the case of utilizing a plurality of communication services, a user must have many radio terminals to all the radio communication systems.

In order to reduce the number of terminal, it is prefer to be able to integrate a plurality of radio transmission mode into a radio terminal.

For one of the solutions for the integration of several radio communication systems, "Software Radio" concept has been proposed. In the software radio concept, we describe all functions for modulation and demodulation in each radio communication terminal as programs for Digital Signal Processing Hardware(DSPH) like FPGA and DSP. By changing the programs in accordance with users' request, we operate all radio communication system with a radio terminal.

However, in conventional concept of software radio, we often change all the configuration programs for a radio communication system whenever a radio transmission system must be changed.

Moreover, the configuration program is written in a high level computer language like "C" language or a low level computer language as assembler. Accordingly, we must prepare several nonvolatile memories for storing a plurality of programs. From the viewpoint of costs, we needs more time for delivering the software radio as the consumer products.

Further, the other method exists, in which all functions configured several radio communication systems has already implemented in the radio communication terminal in advance.

However, in this case, we must equip all the components in a radio terminal whether users use all communication systems or not. Therefore from the viewpoint of cost and miniaturizing, the method is not the best solution for the integration of radio terminal. Moreover, in advance, we write all functions of transmitter and receiver for a radio communication system into a ROM(Read Only Memory) card. Then, by exchange such ROM cards, we realize multimode terminal.

But, in the case of usage of ROM card, users always must have several ROM cards. From the viewpoint of portability, we need refinement of the idea.

SUMMARY OF THE INVENTION

The present invention carried out in order to solve the above-mentioned problem. In the invention, there is a technical characteristic in a point of aiming a difference of system configuration between the recent radio communications.

Concretely, in PHS system and the other systems, the Quadrature modulator is common by providing the selective differential information, which comprises valuable coefficient information writing a differential part between each kind of radio modulation and demodulation scheme, and their address on the DSPH into aforesaid reconfiguable modulation and demodulation function part, we realize our required radio communication terminal. Moreover a selective differential information can be supplied from a base station in an area, in which a radio terminal is used by download.

In the invention, under the circumstance in which several radio communication systems can be utilized, in order to realize several modulation and demodulation schemes of such systems by a communication terminal, the necessary common modulation and demodulation function part such as an orthogonal phase modulator, an automatic gain control part and quasi-synchronized orthogonal detector, and the reconfigurable modulation and demodulation function part which can realize all components related to modulation and demodulation schemes except for the components of common function part by changing parameters, are installed at a mobile base station. With functional selective means which can be activated by providing the selective differential information, which comprises variable coefficient information writing a different part between each kind of radio modulation and demodulation scheme and their address on the DSPH from control station into aforesaid reconfigurable modulation and demodulation function part of a radio base station, the base station can realize several radio communication system.

As described above, by using the multimode terminal of present invention, it is easy to make the size of terminal small and light and reduce a producing cost, in comparison with installing a communication functional means for all of radio communication modes possible to utilize.

Moreover, as for the selective information supplying to a functional selecting means in order to switch a communication mode, it is a simple information only to select a function being effective within a different functional part, transferring from a base station via a radio becomes also to be possible and storing beforehand to a terminal side is easy. Further, as a radio transmission system according to one feature of the present invention, if a common functional part, a differential part and a functional selecting means are installed at a radio base station, the change of a communication mode at a radio station becomes to be possible.

DESCRIPTION OF THE PREFERRED EMBODYMENT

If following embodiment may be referred, the present invention will be understood much more clearly.

EXAMPLE-1

Figure 1:
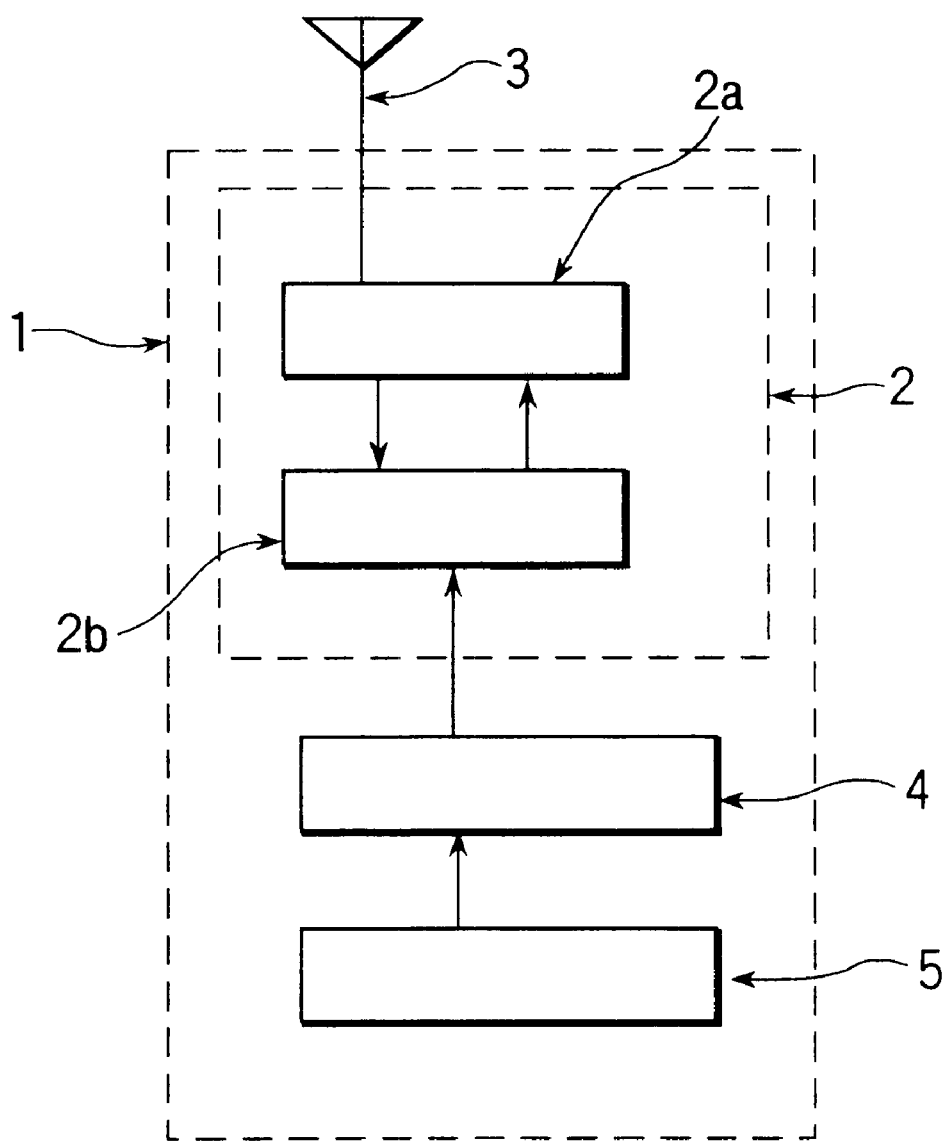
FIG. 1 shows a functional block diagram for a radio terminal used at a radio transmission system according to the present invention.

FIG. 1 is a functional block diagram for radio terminal used to a radio transmission system as example-1 and a radio terminal 1 have a communication terminal 1, a functional means 2, antenna 3, and a selective information specified means 5.

Accordingly, the communication functional means 2 is an unit to have the common modulation and demodulation function part 2a assembling common functional part a common function for each communication mode (for example, an orthogonal phase modulator, an automatic gain control part for receiving a signal, quasi-synchronized detecting part and the like) and the reconfiguable modulation and demodulation function part 2b comprising a function (for example, a shape of a filter, a format for transferring a signal and the like) possible not to be common.

The communication functional means 2 is set so as to a specific communication system by means of activating only a functional realizing means within the reconfigurable modulation and demodulation part 2b, in which the functional selecting means 4 is selected on the basis of a selective information specified by the specified means of differential information.

In other words, for the radio communication systems configured by reconfigurable modulation and demodulation part 2b.

We must prepare the differential information in advance and by specifying the differential information the radio terminal 1 becomes the specified terminal.

Accordingly, it is unnecessary to have many kinds of terminals depending to a prior service system for a portable telephone service, and any portable telephone services for any companies can be performed by means of one terminal.

Further, a differential information to select a function which activate the reconfigurable part 2b is a coefficient information writing a differential part between each kind of radio modulation and demodulation scheme, and their address allocated on the DSPH.

If a reconfigurable circuit possible to change the communication scheme only by means of these numerical value is made out beforehand within a digital signal processing hardware(DPSH), even in the case of changing a system with a communication mode such as an information transmission rate and the like thereafter, replacement for a system can be performed flexibly.

EXAMPLE-2

In the example-1, a basic system was described.

Figure 2:
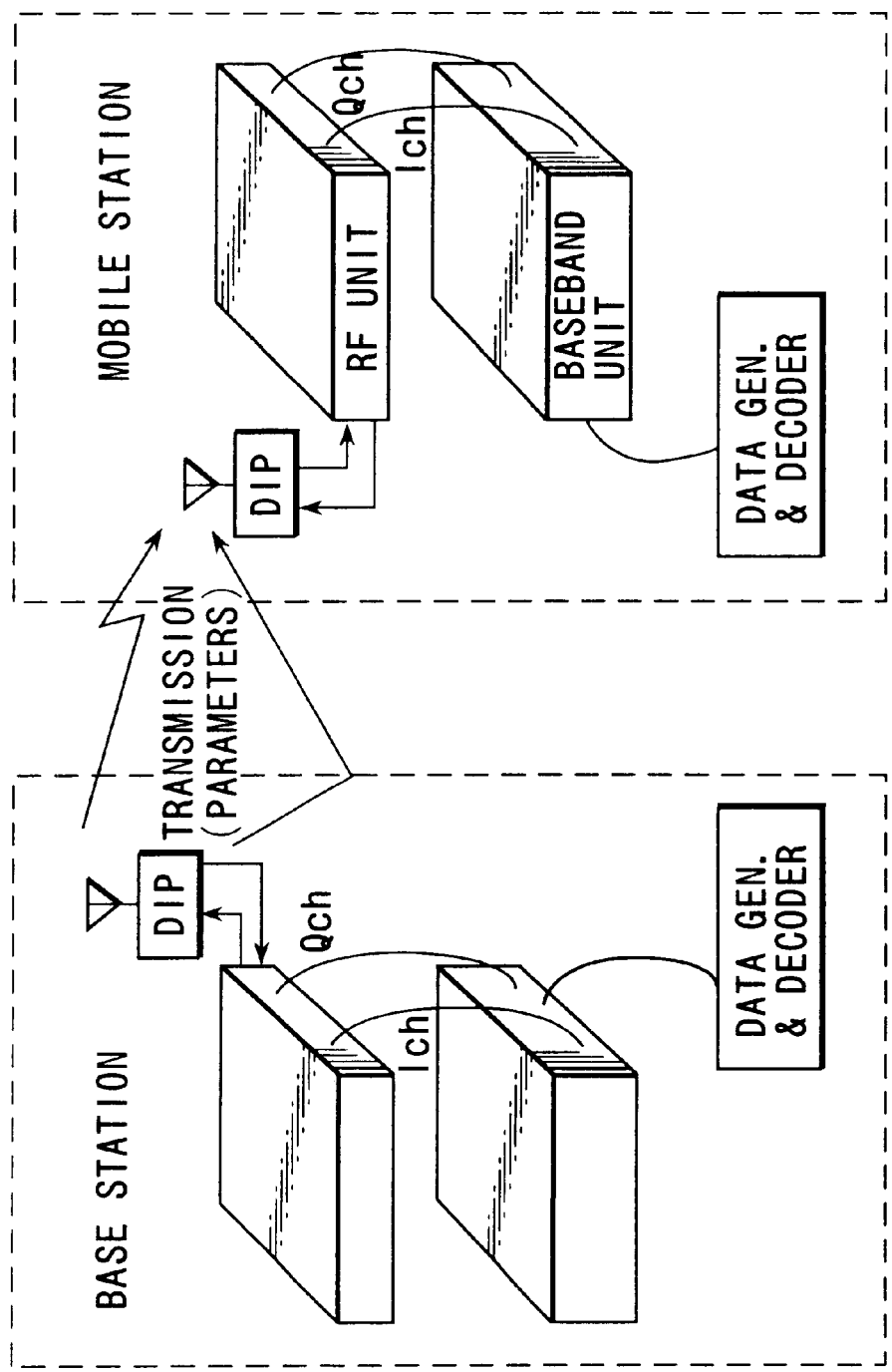
FIG. 2 shows an approximate configuration referring to the second embodyment to transmit from a base station to a mobile station.

FIG. 2 is an approximate configuration for a radio transmission system to transmit a differential information from a base station to a mobile station.

In this example-2, a differential information, that is a selective information, from a radio base station is transmitted with the use of a radio broadcasting type, then mobile stations receiving the differential information establish modulation and demodulation scheme which the base station adopted.

Finally, the both stations start to communicate each other.

As a differential information to transmit with the use of this radio broadcasting, only an coefficient information such as tap coefficient for a filter, a coefficient to determine a shape of a filter, a coefficient to determine a tap coefficient for the sake of an equalization, (in the case of carrying out Fourier transformation at a receiving side) a coefficient to determine a length of FFT code sequence information (for CDMA) and the like is illustrated.

A capacity for these informations is quite small in comparison with the case of full download of all the DSPH programs.

First, when an user having a radio terminal enter into a cell, in which a communication is carried out by some communication systems, the user receives differential information to determine some modulation and demodulation method which is a petty information volume with the use of a control channel.

This parameter is radiated in the state of a radio broadcasting from a base station. Moreover, as information volume is not so large, an error corrected data transmission scheme having much redundancy bit is used. Thereafter, it is prefer to be able to transmit in the state of a free error with the use of an easy modulation a demodulation method.

For example, simple phase modulation of two values (Binary Phase Shift Keying: BPSK) and the like are enough.

Moreover, in the case of receiving a differential information at a radio terminal, it is also necessary to establish anyone of synchronization between a radio base station.

Next, if synchronization is attained once, a differential information is received at a terminal, the terminal becomes to be a transmitter and a receiver corresponding to aforesaid communication on the basis of its information.

Further, replacement for a system comprising only a differential information is carried our rapidly. Moreover, as a receiving information for replacement is finished in the state of small volume, eve in the case of transmitting a parameter information under inferior circumstance, the number for retransmission is finished in the state of small volume. Therefore the replacement becomes to be carried out anytime and anywhere.

Figure 3:
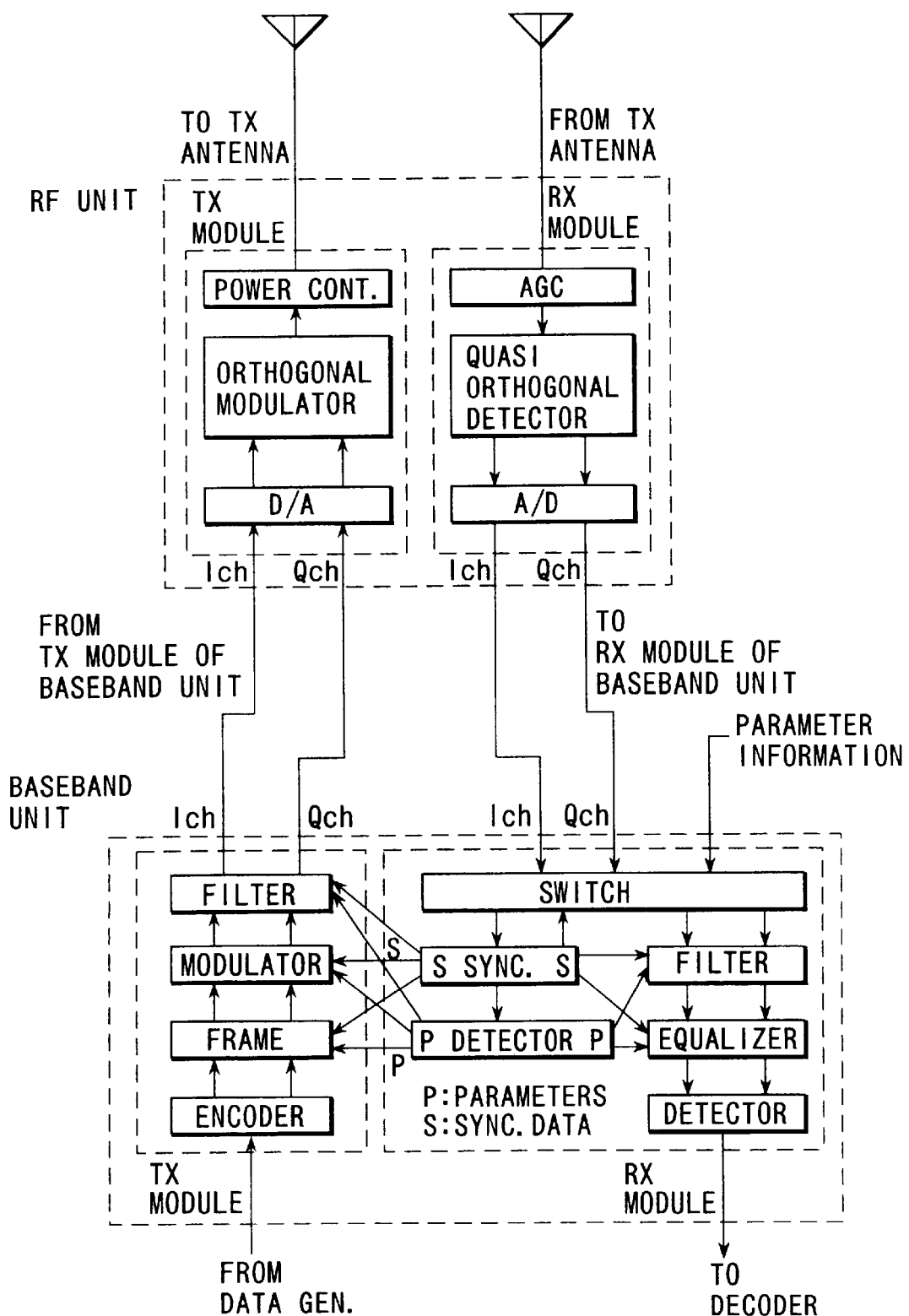
FIG. 3 shows a functional block for a base station or a mobile station used a radio transfer system referring to the second embodiment, FIG. 4 show a functional block in a radio transmission system referring the third embodiment storing a differential to a terminal side.

Detail of a radio terminal to become a mobile station is as shown in FIG. 3.

This comprises two units roughly as described below.

One unit is RF unit for treating a part having high frequency more than a intermediate frequency (IF) baud and another unit is base band unit for modulating demodulation by means of a digital signal processing having much low frequency.

RF unit and base band unit are divided each into two module even within its inside, and as the result, one is TX module functioning at a communication part and another is RX module functioning at a receiving part, respectively.

In TX module in RF unit, an orthogonal phase modulation is carried out by means of converting a transmitted signal as a digital signal from TX module of base band unit to an analogue signal (Digital Analogue converter: D/A) on the IF ban.

Moreover, after control for output power has been carried out, the analogue data of IF band is carried out from a transmitting antenna by means of converting a transmitting signal having a high frequency of RF band.

Further, RX module in RF unit, after an analogue radio high frequency signal received has been converted to low frequency to treat easily, gain control is carried out by means of a part of automatic gain control (AGC) as to become the level of digital processing easily.

And as the result, its signal is detected in the state of wave with the use of a rough orthogonal signal. This is said as "Quasi-synchronized Orthogonal Detector".

Thereafter, separated signals as two orthogonal components of Ich and Qch are sent out to base band unit by means of converting a digital signal with the use of "Analogue to Digital Converter: A/D.

In this case, in order to carry out a digital signal processing much strictly, it is prefer for sampling speed of this A/D converter to be sampling speed more times faster than a speed for an information signal and to adopt many sample data.

At one side, in TX module in base band unit, transmitting data frame format (Frame construction circuit), a filter for limiting transmitted band area, and modulation scheme, are decided on the basis of a differential information input from outside, and as the result, a transmitted signal processed in function. And the difference between the radio communication systems is following.

In the transmitter side, encoding method for data, data transmission speed, frame format (an information for using any part as synchronization and for using any part as data) and shape of a filter are illustrated.

On the other hand, in receiver side, a configuration method of a filter, a format for a transmitted signal, a synchronization method for data, and a decoding method for data, are illustrated.

Accordingly, we own common functions used commonly in each radio communication system as common modulation and demodulation functions, and different functions in each radio communication system are given as a differential information.

In order to solve this problem, in the present invention, a difference part (a differential modulation and demodulation function part) between radio communication systems to be realized is made out for a general-purpose or reconfigurable circuit (for example, a circuit to be able to change a filter configuration freely only by means of a coefficient information for a filter) capable to drive only by means of a selective differential information, and the present invention is so that a differential modulation and demodulation function part may be to set a function corresponding to a specific communication system by means of supplying a corresponding selective differential information to a communication terminal for specifying a radio communication system which an user would like to utilize or can utilize.

Further, although a differential information consists of an address onto a digital signal processing hardware to carry out a modulation and demodulation scheme corresponding to each kind of radio communication system and a rewritable and changeable information for a different part between radio communication modulation and demodulation systems paid attention to difference of each kind of modulation and demodulation scheme abovementioned to store in aforesaid address, said information is not a program.

In the invention referring to claim 1, under the circumstance in which several radio communication systems can be utilized, in order to realize such systems by a communication terminal, several modulation and demodulation schemes of the necessary common modulation and demodulation function part such as an orthogonal phase modulator, an automatic gain control part, and quasi-synchronized orthogonal detector and the reconfigualable modulation and demodulation function part which can realize all components related to modulation and demodulation except for the components of common function part by changing parameters are installed at a radio communication terminal. Then with functional selective means which can be activated the digital state is transmitted for RF unit.

On the other hand, in RX module of base band unit, after a synchronizing timing needed to receiving a signal on the basis of a differential information input from outside, a filter form for limiting a band area at a receiving signal side, a method for equalization, and a method for demodulation, are decided, in RX module of RF unit, the transmitted data from a orthogonal signal of receiving signal converted to a digital signal are demodulated.

Each function determined by abovementioned differential information in base band unit, is reconfigurable function, and the other function in base band and RF unit is common function.

EXAMPLE-3

Figure 4:
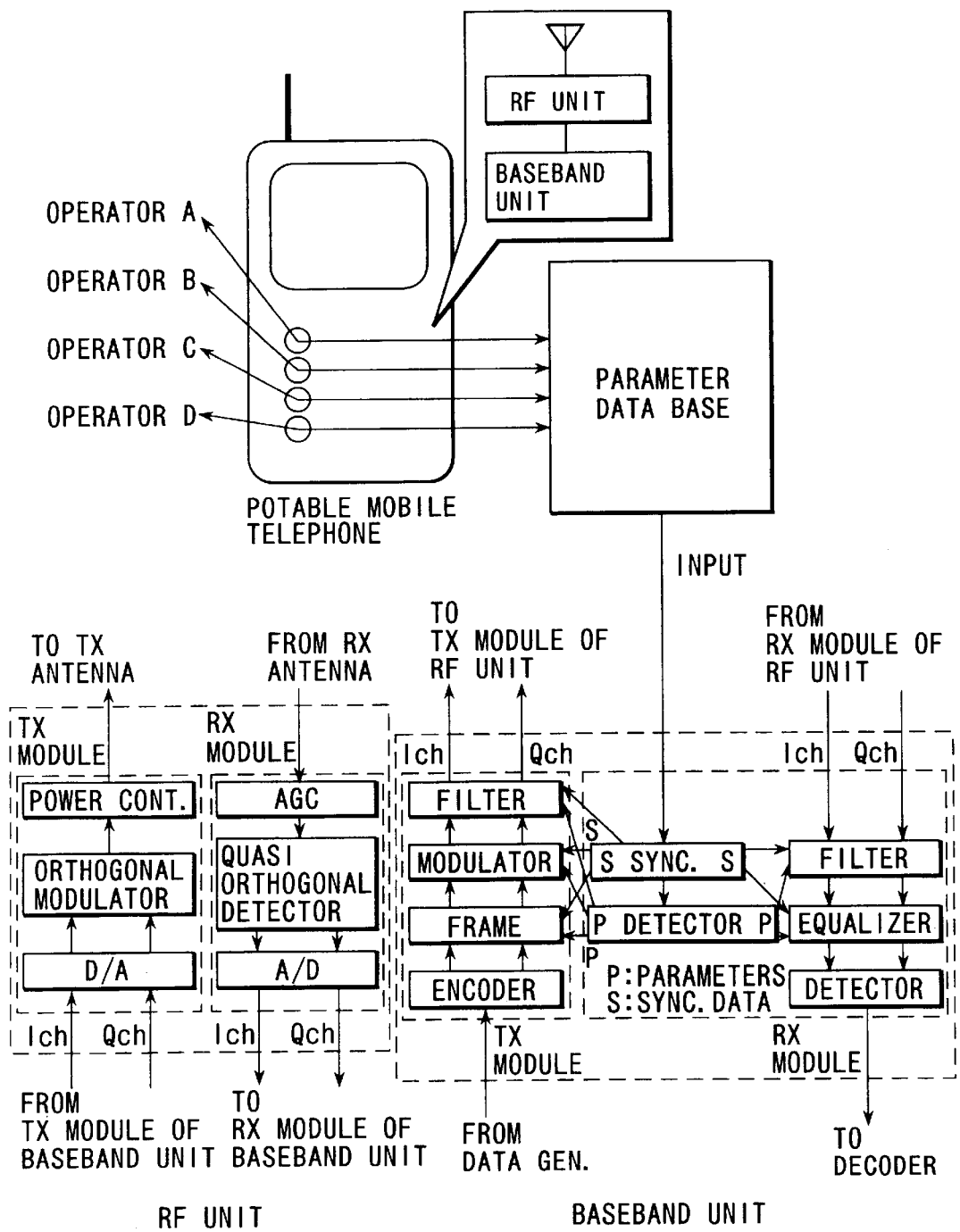

FIG. 4 is a functional block diagram in a radio transmitting system referring to example-3 so as to store a differential information at a terminal side.

In the present example, a differential information referring to modulation and demodulation scheme for the use of communication apparatuses of each company is stored in the form of database at a radio terminal side. Moreover, the present example is multi-mode mobile communication system, in which a user can utilize systems for a plurality of companies only with the use of a switch attached to a portable telephone, of driving type with a user.

In the difference between the present example and abovementioned example-2, database, in which a differential information for the use of communication apparatuses of each company is input, are input beforehand. For example, a corresponding differential information for the use of communication apparatuses is input from data base to base-band unit as data and a synchronizing information to constitute a transmitter and a receiver by means of selecting buttons from "A" to "D" with an user, and as the result, the desired modulating demodulation scheme can be attained.

Moreover, after a communication mode has been established, a communication is carried out by means of the same method as each abovementioned embodiment.

Further, in the present embodiment, a user can select a communication mode optionally and it has advantage that there is unnecessary to carry out a communication to a radio base station until a communication mode will be established.

EXAMPLE-4

Figure 5:
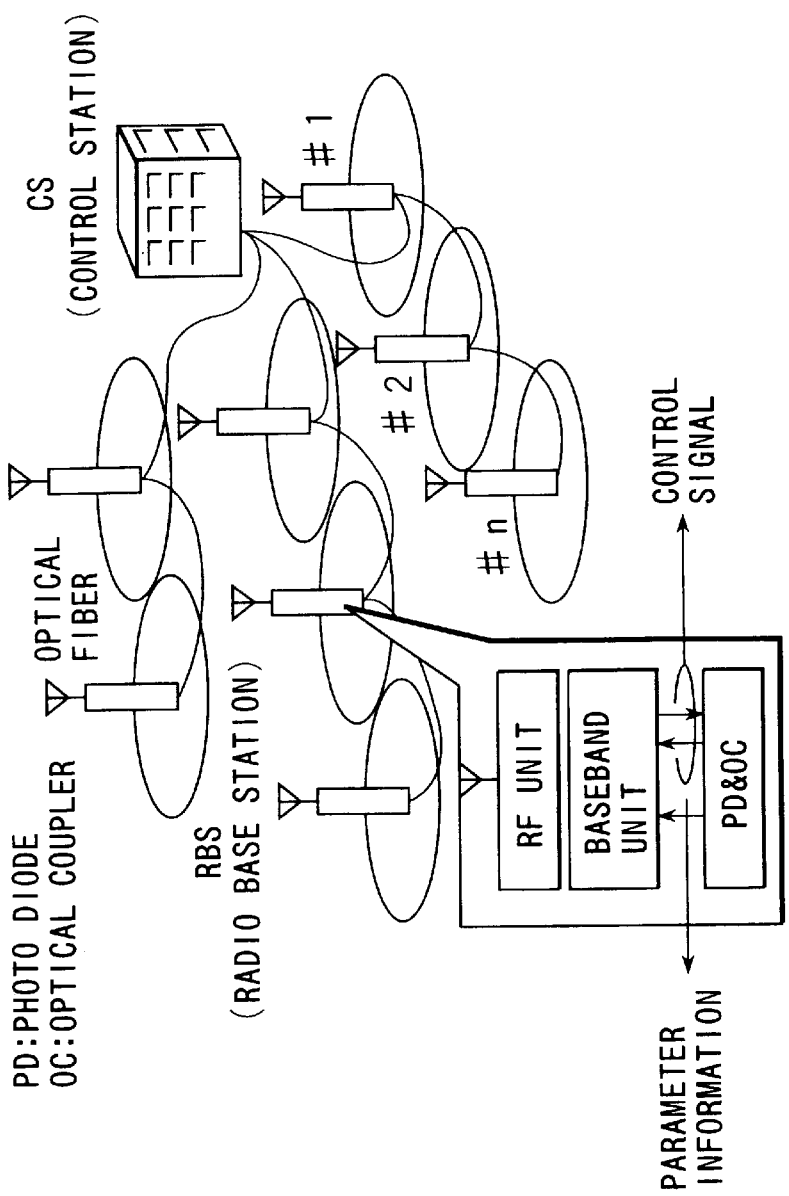
FIG. 5 shows an approximate configuration referring to the fourth embodiment supplying a different information from a control station.

FIG. 5 is an approximate configuration referring to example-4. In which replacement for a communication mode at a radio base station is performed.

In the present embodiment, if it is assumed that a plurality of radio base stations (RBS) are controlled concentrically with the use of a control station (CS), when a system at a radio base station has been replaced, the control station(CS) transmits its differential information for each radio base station (RBS) via a wired system such as an optical fiber and the like.

The control station (CS) has a laser diode for the sake of propagating to a transmission line by means of changing a differential information to an optical signal, and the radio base station (RBS) equips RF unit and a base-band unit together with a photo diode and the like, by which a received photo signal changes an electrical signal.

The radio base station (RBS), that is, constitutes a transmitter and a receiver on the basis of an up-to-date differential information received from the control station (CS).

Accordingly, as the radio base station (RBS) cm be made to correspond to various radio communication mode corresponding to a differential information transmitted from the control station (CS), it becomes to be able to construct a system that the radio base station (RBS) is controlled concentrically with the use of the control station(CS).

EXAMPLE-5

Figure 6:
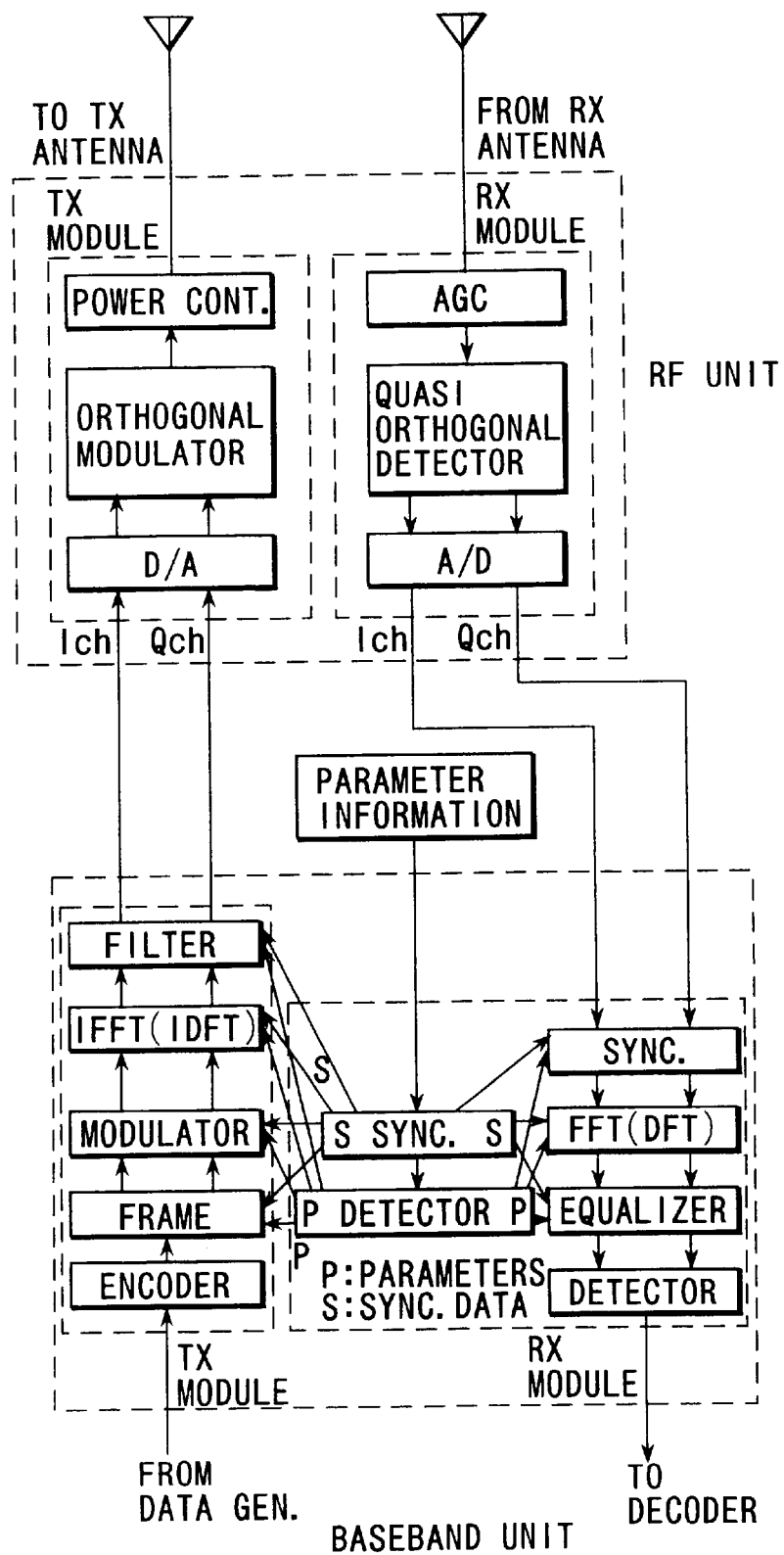
FIG. 6 shows a radio transmission and receiving system referring the fifth embodiment adapted to a television system, for a next generation.
Figure 7:
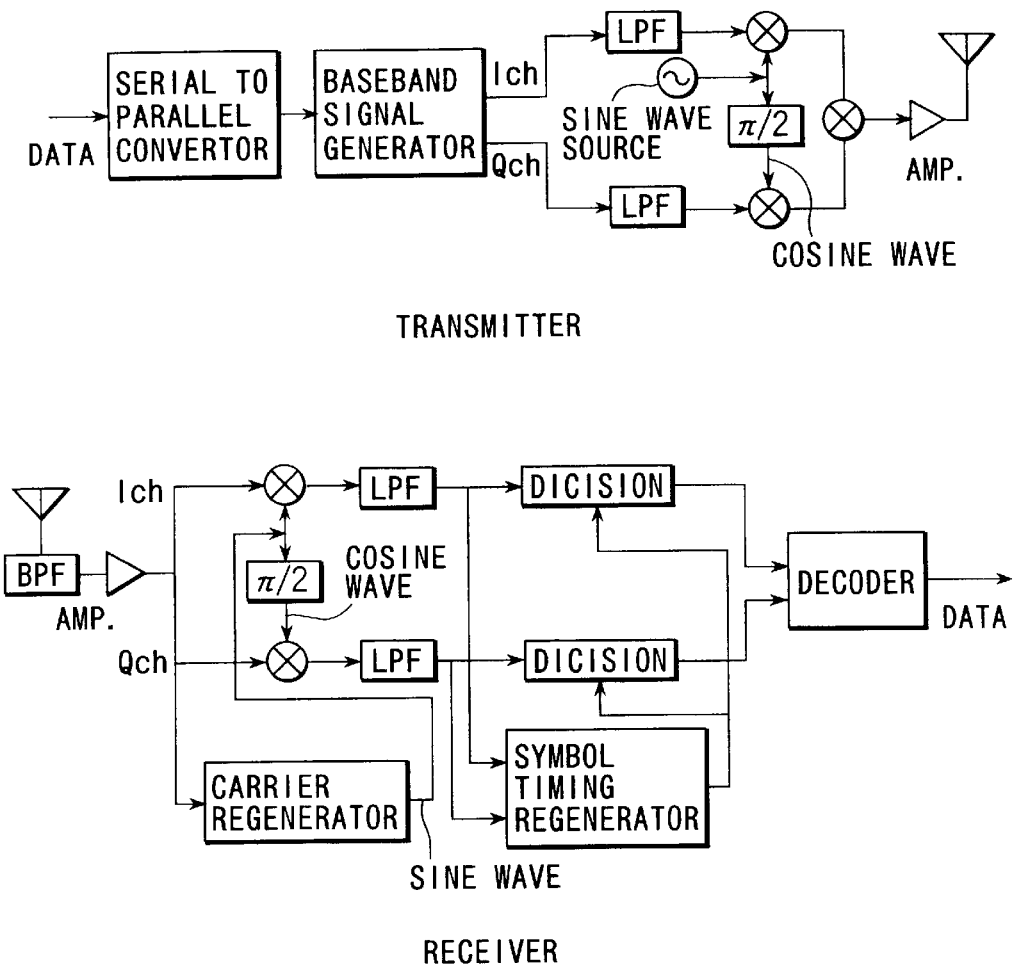
FIG. 7 shows a functional block for a transmitter and a receiver constituting a prior radio transferring system.

FIG. 6 shows example-5 in the case of using the present invention to a television system of next generation.

Nowadays, an orthogonal frequency division multiplex transmission (OFDM) is proposed as a digital broadcasting system, having large capacity, of next generation.

As its reason, it is illustrated that a signal transmitted in a radio communication receives that oily a direct wave from a transmitting side but also delay wave by means of reflection such as a building and the like.

Moreover, as a transmitting speed for an information signal becomes higher, this delay wave becomes to be interference wave to the other information signal, and the delay waves prevent a smooth communication referring to an information signal.

Further, an orthogonal frequency division multiple, (OFDM) transmission is one of tie scheme to transmit such a high-speed data under multi-path environment.

In OFDM, a high speed data is transmitted by mean of dividing into a signal with a low speed, in which there is a little for an influence of a delayed wave. Then a transmission is carried out by means of multiplexing for a frequency division with the use of an Inverse Fast Fourier transformation (IFFT) in order to multiplex their divided signals. In a receiving side, the transmitting OFDM data is demodulated by the multiplex with the use of a Fast Fourier transform (FFT).

As described above, there is less influence with interference by means of dividing an information signal with a high speed into an information signal with a low speed.

However, in a radio broadcasting with a television all over the worlds, although a communication system (modulation and demodulation scheme) has already fixed a detailed specification is different.

However the difference of the communication system is only the number of a step number with a Inverse Fast Fourier Transform in the transmitter side, a guard time for delayed waves, a method for synchronization in receiving side, the step number for a Fourier Transform in the receiver side and a method for an equalization. A transmitting and receiving system for all radio broadcastings becomes to be able to realize.

If abovementioned system is changed so as to adopt each radio broadcasting system as a different function part, that is, it is possible for a common television receiver in order to correspond to various radio broadcasting systems.

Accordingly, functions such as IFFT and FFT are included within a base-band unit and a receiving system with all television and radio broadcasting becomes to be possible, Further, in the present example-4, although a configuration possible to transmit from a television receiver, and become a receiving terminal, is illustrated for the cable television system possible to communicate at two-way, However, for the television set, we used only RX module.

As described above, according to a radio transmission system according to the present application, as a common function part, a reconfigurable function part, and means for selecting a function, were installed, and as a configuration was composed so as to become a radio communication terminal possible to communicate with the use of a radio communication mode corresponding to a selective information, it becomes easy to make the size small and light weight, and it becomes possible to restrain cost for producing in comparison with installing means for a communication function by means of all radio communication mode possible to utilize at a communication terminal.

Moreover, in order to switch a communication mode, as a selective information supplying to a functional selection means, is a simple information only to select a function, it is possible also to transmit With the use of a radio from a base station and it is easy also to storage beforehand at a terminal side.

Further, as a radio transfer system according to one feature of the present application, if a common functional part, a reconfigurable functional part, and a functional selection means are installed at a radio base station, it becomes to be possible to realize multimode at a radio base station to change.

What is claimed is:

1. A multi-mode radio transmission system for communicating using a plurality of radio communication systems, comprising:
    a multi-mode mobile radio communication terminal, including
        a common modulator and demodulator part, having
            an orthogonal phase modulator,
            an automatic gain controller, and
            a quasi-synchronized orthogonal detector,
        a reconfigurable modulator and demodulator part having reconfigurable circuits allocated on digital signal processing hardware and configured to realize all components related to modulation and demodulation schemes of said plurality of radio communication systems except components related to said common modulator and demodulator part through numerical parameters, and function selection means being supplied with a plurality of pieces of differential information, selecting one piece of information from said plurality of pieces of differential information, and providing said one piece of information to said reconfigurable circuits as said numerical parameters, a control station configured to supply differential information, a base station configured to communicate with said multi-mode mobile radio communication terminal and said control station, and wherein, said differential information is supplied from said control station to said base station via optical fiber, and is supplied from said base station to said multi-mode mobile radio communication terminal, said differential information includes addresses of said reconfigurable circuits to be provided said numerical parameters, and said numerical parameters specify at least one of
an encoding method for data transmission,
a data transmission speed,
a frame format for data transmission,
a tap coefficient for a filter,
a coefficient to determine a shape of a filter,
a coefficient to determine a tap coefficient for use in equalization,
a number of steps included in a fast Fourier transformation,
a number of steps included in an inverse fast Fourier transformation,
a guard time for delayed waves,
a synchronization method for synchronizing data, and
an equalization method for equalizing data.

2. The multi-mode radio transmission system of claim 1, wherein:

said multi-mode mobile radio communication terminal further includes a storing part configured to store said plurality of pieces of differential information to be supplied to said function selection means in advance, and an accepting means for accepting an input from a user specifying one of said plurality of pieces of differential information stored in said storing part so as to cause said function selection means to select said one of said plurality of pieces of differential information.

3. The multi-mode radio transmission system of claim 1, wherein:

said multi-mode mobile radio communication terminal works as a television receiver, and said numerical parameters specify
a number of steps in a fast Fourier transformation,
a guard time for delayed waves,
a synchronizing method for synchronizing data,
a number of steps in an inverse fast Fourier transformation, and
an equalization method for equalizing data.

4. A multi-mode radio transmission system for communicating using a plurality of radio communication systems, comprising:

a multi-mode mobile radio communication terminal, including a common modulator and demodulator part, having
an orthogonal phase modulator,
an automatic gain controller, and
a quasi-synchronized orthogonal detector, a reconfigurable modulator and demodulator part having reconfigurable circuits allocated on digital signal processing hardware and configured to realize all components related to modulation and demodulation schemes of said plurality of radio communication systems except components related to said common modulator and demodulator part through numerical parameters, and function selection means being supplied with a plurality of pieces of differential information, selecting one piece of information from said plurality of pieces of differential information, and providing said one piece of information to said reconfigurable circuits as said numerical parameters, a base station configured to communicate with said multi-mode mobile radio communication terminal, wherein said differential information includes addresses of said reconfigurable circuits to be provided said numerical parameters, said numerical parameters specify at least one of
an encoding method for data transmission,
a data transmission speed,
a frame format for data transmission,
a tap coefficient for a filter,
a coefficient to determine a shape of a filter,
a coefficient to determine a tap coefficient for use in equalization,
a number of steps included in a fast Fourier transformation,
a number of steps included in an inverse fast Fourier transformation,
a guard time for delayed waves,
a synchronization method for synchronizing data, and
an equalization method for equalizing data, and said differential information is supplied from said base station using a predefined radio communication system, which uses an error-free modulation and demodulation scheme, including a binary phase shift keying scheme.

5. A multi-mode mobile radio communication terminal for communicating using a plurality of radio communication systems, comprising:

a common modulator and demodulator part including
an orthogonal phase modulator,
an automatic gain controller, and
a quasi-synchronized orthogonal detector;

a reconfigurable modulator and demodulator part having reconfigurable circuits allocated on digital signal processing hardware and configured to realize all components related to modulation and demodulation schemes of said plurality of radio communication systems except components related to said common modulator and demodulator part through numerical parameters, and function selection means being supplied with a plurality of pieces of differential information, selecting one piece of information from said plurality of pieces of differential information, and providing said one piece of information to said reconfigurable circuits as said numerical parameters, a receiving unit for receiving said differential information from a base station, said differential information is supplied from a control station to said base station via optical fiber, and wherein,
said differential information includes addresses of said reconfigurable circuits to be provided said numerical parameters, and
said numerical parameters specify at least one of
an encoding method for data transmission,
a data transmission speed,
a frame format for data transmission,
a tap coefficient for a filter,
a coefficient to determine a shape of a filter,
a coefficient to determine a tap coefficient for equalization,
a number of steps included in a fast Fourier transformation,
a number of steps included in an inverse fast Fourier transformation,
a guard time for delayed waves,
a synchronization method for synchronizing data, and
an equalization method for equalizing data.

6. The multi-mode radio communication terminal of claim 5, further comprising:
a storing part configured to store said plurality of pieces differential information to be supplied to said function selection means in advance, and
accepting means for accepting an input from a user specifying one of said plurality of pieces of differential information stored in said storing part so as to cause said function selection means to select said one of said plurality of pieces of differential information.

7. The multi-mode radio communication terminal of claim 5, working as a television receiver, and
said numerical parameters specify
a number of steps in a fast Fourier transformation,
a guard time for delayed waves,
a synchronizing method for synchronizing data,
a number of steps in an inverse fast Fourier transformation, and
an equalization method for equalizing data.

8. A multi-mode radio transmission system for communicating using a plurality of radio communication systems, comprising:
a radio base station configured to communicate with a radio communication terminal, said base station including
a common modulator and demodulator part having
an orthogonal phase modulator,
an automatic gain controller, and
a quasi-synchronized orthogonal detector,
a reconfigurable modulator and demodulator part having reconfigurable circuits allocated on digital signal processing hardware and configured to realize all components related to modulation and demodulation schemes of said plurality of radio communication systems except components related to said common modulator and demodulator part through numerical parameters, and
function selection means being supplied with a plurality of pieces of differential information, selecting one piece of information from said plurality of pieces of differential information, and providing said one piece of information to said reconfigurable circuits as said numerical parameters,
a supplying unit for supplying said differential information with said radio communication terminal using a predefined radio communication system, with an error-free modulation and demodulation scheme, including a binary phase shift keying scheme, and wherein,
said differential information includes addresses of said reconfigurable circuits to be provided said numerical parameters, and
said numerical parameters specify at least one of
an encoding method for data transmission,
a data transmission speed,
a frame format for data transmission,
a tap coefficient for a filter,
a coefficient to determine a shape of a filter,
a coefficient to determine a tap coefficient for equalization,
a number of steps included in a fast Fourier transformation,
a number of steps included in an inverse fast Fourier transformation,
a guard time for delayed waves,
a synchronization method for synchronizing data, and
an equalization method for equalizing data.

9. The multi-mode radio transmission system of claim 8, wherein:
said base station communicates with a control station; and
said base station is configured to accept an optical signal specifying said differential information sent from said control station via optical fiber, convert said optical signal to an electric signal, and send said electric signal to said mobile terminal using said error-free modulation and demodulation scheme, including a binary phase shift keying scheme.

10. A radio base station using a plurality of radio communication systems to communicate with a radio communication terminal, comprising:
a common modulator and demodulator part including
an orthogonal phase modulator,
an automatic gain controller, and
a quasi-synchronized orthogonal detector;
a reconfigurable modulator and demodulator part having reconfigurable circuits allocated on digital signal processing hardware and configured to realize all components related to modulation and demodulation schemes of said radio communication systems except components related to said common modulator and demodulator part through numerical parameters;
function selection means for being supplied with a plurality of pieces of differential information, selecting one piece of information from said plurality of pieces of differential information, and providing said one piece of information to said reconfigurable circuits as said numerical parameters; and
a supplying unit for supplying said differential information with said radio communication terminal using a predefined radio communication system which uses an error-free modulation and demodulation scheme including a binary phase shift copying scheme, and
wherein
said differential information includes addresses of said reconfigurable circuits to be provided said numerical parameters, and
said numerical parameters specify at least one of
an encoding method for data transmission,
a data transmission speed,
a frame format for data transmission,
a tap coefficient for a filter,
a coefficient to determine a shape of a filter,
a coefficient to determine a tap coefficient for use in equalization, a number of steps included in a fast Fourier transformation,
a number of steps included in an inverse fast Fourier transformation,
a guard time for delayed waves,
a synchronization method for synchronizing data, and
an equalization method for equalizing data.

11. The base station of claim 10, wherein:

said base station is configured to communicate with a control station; and said base station is configured to accept an optical signal specifying said differential information sent from said control station via optical fiber, convert said optical signal to an electric signal and send said electric signal to said mobile terminal using said error-free modulation and demodulation scheme, including a binary phase shift keying scheme.

\* \* \* \* \*